United States Patent Office 3,317,437
Patented May 2, 1967

3,317,437
PROCESS FOR THE PRODUCTION OF
ALFIN CATALYSTS
William W. Hoffman, Fort Mitchell, Ky., and Fred K. Morgan, North College Hill, Ohio, assignors to National Distillers and Chemical Corporation, New York, N.Y., a corporation of Virginia
No Drawing. Filed Apr. 8, 1963, Ser. No. 271,487
7 Claims. (Cl. 252—431)

This invention relates to a novel Alfin catalyst, a method of preparing the same and to the use of said catalyst in the polymerization of unsaturated organic compounds.

There exists a voluminous body of literature concerning Alfin catalysts, methods of preparing the same and the use thereof in the polymerization of unsaturated organic compounds, particularly conjugated diolefinic hydrocarbons. These Alfin catalysts as originally developed by A. A. Morton and co-workers may be defined as a complex of an alkali halide with the sodium compound of one or more methyl-n-alkyl carbinols and the sodium compound of one or more vinyl monoolefins, such vinyl monoolefin either having at least one alkyl group attached to a carbon atom of the vinyl group or having two alkyl groups attached one to each of the carbon atoms of the vinyl group. The preferred example of the alkali halide is sodium chloride. An example of the sodium compound of the methyl-n-alkyl carbinols is sodium isopropoxide. An example of the sodium compound of the vinyl monoolefins is allyl sodium.

The catalysts have been found to possess particular utility in the polymerization of conjugated diolefinic hydrocarbons, e.g. butadiene, with or without comonomers, such as vinyl aromatics including styrene, to produce synthetic elastomers. The use of an Alfin catalyst results in an unusually rapid rate of reaction and in good yields of polymer. In comparison with synthetic rubbers made by conventional catalytic polymerizing techniques, the Alfin rubbers are generally gel-free and have higher flex-life values, high tensile strength, superior abrasion resistance and tear strength.

The Alfin catalysts of this invention are particularly well adapted to the polymerization of butadiene itself, i.e. 1,3-butadiene, and to the copolymerization of 1,3-butadiene and styrene, but are also applicable to the formation of polymers and copolymers of other unsaturated organic compounds as, for example, other butadienes, such as 2,3-dimethyl-1,3-butadiene, isoprene, piperylene, 3-furyl-1,3-butadiene, 3-methoxy-1,3-butadiene, and the like; aryl olefins such as styrene, various alkyl styrenes, p-chlorostyrene, p-methoxystyrene, alpha-methylstyrene, and similar derivatives, and the like.

The catalysts are also effective when a monomeric material such as listed above is copolymerized with one or more other compounds which are copolymerizable therewith, such as aryl olefins.

In addition to using as the monomer pure or rubber-grade butadiene, which contains about 99.6 weight percent of butadiene, the polymerization process of this invention can be applied to impure or dilute butadiene, which contains about 12 to about 40 weight percent of butadiene. The composition of the polymer prepared from a lean butadiene stream, however, is the same as that prepared from pure butadiene, that is, about 30% of the 1,2-isomer and about 70% of the trans-1,4 isomer.

Following prior art teachings, Alfin catalfsts have been prepared by reacting amyl chloride and metallic sodium in a hydrocarbon solvent, e.g. pentane, to produce amyl sodium which was then reacted first with isopropyl alcohol and then with propylene to form the final catlayst containing sodium chloride, sodium isopropoxide and allyl sodium. This procedure is illustrated by the following Equation I:

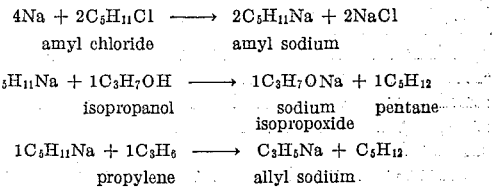

The above reaction must be conducted in the absence of air and water, and requires refrigeration in order to maintain the temperature of the reaction mixture between −20° and +20° C., since the reactions are exothermic and temperatures above those indicated result in a breakdown of the catalyst.

It is an object of the present invention to provide a novel Alfin catalyst.

It is a further object of this invention to provide an improved process for the production of Alfin catalysts.

It is a further object of this invention to provide a process for the production of Alfin catalysts which requires lesser quantities of reactants than have been needed heretofore, which produces Alfin catalysts with an almost quantitative utilization of sodium and alkyl halide, and which requires no refrigeration with attendant expenses and difficulties in order to obtain the desired result.

It is a further object of this invention to provide a method for the preparation of Alfin catalysts from butyl sodium in higher yields than have been heretofore possible.

It is a further object of this invention to provide a method for the polymerization of unsaturated organic compounds employing the novel Alfin catalysts of this invention.

Other objects and attendant advantages of this invention will become apparent upon perusal of the following description.

The present invention is based on the discovery that considerable economy in catalyst materials can be effected by changing the order of addition of the reactants shown in the above equations. Thus, according to the present invention, a methyl-n-alkyl carbinol, preferably isopropanol is reacted with excess sodium in an inert hydrocarbon solvent to produce sodium isopropoxide. An alkyl halide, preferably butyl chloride, is then reacted with the remaining sodium in the mixture of sodium isopropoxide and sodium to produce butyl sodium and sodium chloride. An excess of a vinyl monoolefin, preferably propylene, is then added to the reaction mixture to react with the butyl sodium to produce allyl sodium and butane. This series of reactions is conducted in situ and each is allowed to proceed to completion before the start of the next. The series of reactions is illustrated by the following Equation II:

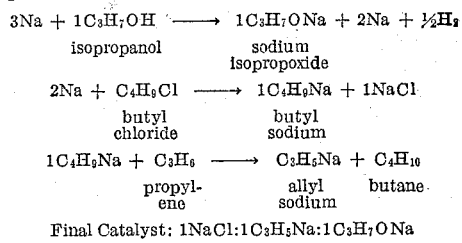

By comparing the equations according to the present invention (II) with the equations shown previously (I), illustrating prior art methods, it is apparent that there is effected a savings of ½ of the alkyl halide and ¼ of the sodium. Aside from this apparent advantage, it is also found that by the method of this invention one may obtain 100% utilization of n-butyl chloride which has been found to be impossible in the prior art Alfin catalyst polymerization method. Though not desiring to be bound by any particular theory, this improvement in yield may be due to the stabilizing action of sodium isopropoxide on sodium alkyl, thereby preventing Wurtz and other side reactions and making it possible to dispense with refrigeration. According to the process of this invention, the reaction can be conducted at ambient or higher temperatures, e.g. under reflux at the boiling point of the solvent employed.

Another substantial advantage of this process is the fact that it permits the substitution of n-butyl chloride for n-pentyl chloride which n-butyl chloride is substantially less expensive and more readily available in tonnage quantities for large scale practical use.

It will be noted also by comparing the above two sets of equations that the final ratio of sodium chloride:alkyl sodium:sodium isopropoxide is 1:1:1 in the catalyst of this invention as compared to 2:1:1 in the prior art-type Alfin catalyst.

In conducting polymerization or interpolymerization reactions with the catalysts of this invention, there should generally be used about 1 to about 5% by weight catalyst, based on the total sodium content, and preferably about 1.8 to about 2.2 weight percent. The polymerization reaction generally takes place at atmospheric pressure and room temperature in a suitably inert reaction medium. Pressure and temperature conditions may vary over a substantial range as between about 1 atmosphere and about 50 atmospheres pressure and at temperatures between about −25° C. and +68° C. The reaction medium is suitably an inert hydrocarbon, e.g. pentane, hexane, a 1:1 mixture of hexane and pentane, cyclohexane, decalin, heptane, and the like, or mixtures thereof, with hexane and pentane being preferred. The rigorous exclusion of water from solvents, monomer and apparatus is important.

The process may be conducted in a batchwise, semi-continuous, or continuous manner, and polymers and copolymers so produced may be isolated by any of the conventional techniques.

The Alfin catalysts of this invention may be employed not only in conventional polymerization processes as described in the prior art, but also in modifications thereof, particularly in the molecular weight controlled polymerization process such as described in U.S. Patent No. 3,067,187 to Greenberg et al.

The more detailed practice of this invention is illustrated by the following examples wherein parts are given by weight unless otherwise specified. These examples and embodiments are illustrative only, and the invention is not intended to be limited thereto except as indicated by the appended claims.

EXAMPLE I

The preparation of Alfin catalyst according to prior art methods was carried out as follows:

Dry hexane (660 parts) was charged to a 3-necked flask provided with stirrer, inert gas sweep, a Dry Ice reflux condenser system, and an external cooling bath. To this was added 132.4 parts of finely divided sodium (2 microns maximum particle size) (1.6 gram-atoms) dispersed in alkylate. The slurry was cooled to −10° C., and 102 parts of dry n-amyl chloride (0.84 mole) was added slowly with moderate stirring which was continued for one hour after the addition had been completed. Then 30.6 parts of isopropyl alcohol (0.4 mole) was added slowly. Stirring was then maintained for an additional 45 minutes. Excess dry propylene (C.P. grade) was subsequently introduced into the mixture, the temperature of which was maintained at −10° C. until active reflux of the propylene occurred. The temperature was then raised gradually to 25° C., and the mixture was stirred at this temperature for two hours. During the last 15 minutes the propylene was allowed to leave the system and was collected for recycle. The reaction slurry was transferred to a storage vessel maintained in an inert atmosphere of argon and was then diluted to 1120 parts with dry hexane. This slurry, that is, the Alfin catalyst, contained 0.4 mole of sodium isopropoxide, 0.4 mole of allyl sodium and 0.8 mole of sodium chloride.

EXAMPLE II

Preparation of Alfin catalyst according to the present invention was carried out as follows:

Dry hexane, 660 grams was charged into a 3-necked flask provided with stirrer and a Dry Ice reflux condenser. To this was added 96.6 grams of finely divided sodium (1.2 gram-atoms) dispersed in alkylate as 28.6% dispersion. Isopropyl alcohol (0.4 mole) was added to this dispersion over a period of 20 minutes and permitted to react for 25 minutes more at ambient temperature and without cooling. n-Butyl chloride (44.5 g. or 0.42 mole) was now added over a period of 25 minutes. Stirring was maintained for an additional hour without cooling. Excess dry propylene (C.P. grade) was subsequently introduced into the mixture and maintained under reflux for 2 hours. The preparation was then permitted to degas (propylene) at room temperature without stirring. The reaction slurry or catalyst was transferred to a storage vessel under inert gas and diluted with sufficient dry hexane to make 1120 grams (or 1600 cc.).

This slurry contains 0.4 mole of sodium isopropoxide, 0.4 mole allyl sodium and 0.4 mole sodium chloride.

EXAMPLE III

To 100 parts of dry hexane was added 2.0 parts of 1,4-dihydrobenzene (molecular weight moderator). Thirty parts of dry butadiene (about 98 weight percent) was then dissolved in the dry hexane at about −10° C. Alfin catalyst prepared according to Example II (17.5 parts, containing 0.065 gram of solid per ml.) was added to the butadiene-hexane solution; the system was sealed and maintained at room temperature with intermittent shaking for about 2 hours. The system was then opened, and ethanol was added to destroy the catalyst and to precipitate the product. The product was then washed intermittently with ethanol and water containing antioxidant to remove soluble inorganic residues (such as sodium isopropoxide and sodium chloride). The resulting insoluble material was polybutadiene. It was given a final wash with acetone containing an antioxidant, N-phenyl 2-naphthylamine, and then dried in an oven at 40° C. under vacuum. A 96% yield, based on the charged weight of butadiene, was obtained. The polymer had a molecular weight of 537,000 and an intrinsic viscosity of 3.9. Average mol. weight was determined by preparing 0.1 and 1.0% solutions of the polymer in toluene, determining their viscosity at 25° C. and extrapolating the viscosity to infinite dilution, and then applying standard viscosity-molecular weight laws.

Intrinsic viscosities were measured in toluene at 25° C. using the expression $M^a = \eta/k$, where $\eta$ is the intrinsic viscosity, and $k$ and $a$ are constants for polybutadiene determined for linear polymers of known molecular weights; $a$ is approximately 0.62 and $k$ is $11 \times 10^{-4}$.

EXAMPLE IV

Dry butadiene (about 98 weight percent) was metered at the rate of about 60 parts per hour into a stirred suspension of 210 parts of Alfin catalyst prepared according to Example II and 10 parts of 1,4-dihydrobenzene in 300 parts of hexane. The reaction ran for six hours at room temperature. (The almost complete retention of butadiene was assured by the carbon dioxide-acetone cooled condenser included in the system which became operative if the feed of butadiene exceeded the rate of reaction.) After all of the butadiene had been added, stirring was continued for two hours. The resulting polybutadiene was then treated with alcohol to destroy the catalyst and then with alcohol and water. It was then dried. The yield was 95% of a polymer having a molecular weight of 229,000 and an intrinsic viscosity of 2.3.

EXAMPLE V

Into a suspension of 105 parts of Alfin catalyst prepared in Example II in 660 parts of hexane containing 15 parts of 1,4-dihydrobenzene was passed, at the rate of about 30 parts per hour, a stream containing about 40% butadiene, 55% 1- and 2-butenes, and some propylene and ethylene. The reaction was continued for six hours, the polymer was worked up as in Example IV, and 62 parts of polymer having a molecular weight of 170,000 and an intrinsic viscosity of 2.0 were recovered.

EXAMPLE VI

The procedure of Example IV was repeated, except that the solvent was cyclohexane instead of hexane. Comparable results were obtained.

The procedure of Example IV was repeated, except that a 70/30 weight mixture of butadiene and styrene was used instead of butadiene alone. The following results were obtained:

TABLE

| Run | Moderator, parts | Butadiene, parts | Styrene, parts | Polymer Yield, parts | Polymer Yield, percent | Intrinsic Viscosity | Molecular Weight |
|---|---|---|---|---|---|---|---|
| 1 | 0 | 27.8 | 12.9 | 40 | 98.5 | Gel | |
| 2 | 8.2 | 360 | 17.7 | 348 | 92.0 | 2.35 | 324,000 |
| 3 | 10.4 | 360 | 150 | 490 | 96.0 | 2.13 | 269,000 |

The description has set forth a method for producing a novel Alfin catalyst which method effects substantial economies in the quantities of reactants, avoids the necessity for close control of temperature conditions during reaction, allows the reaction to be conducted without the need for expensive refrigeration equipment and produces almost quantitative yields of catalysts. In the case of a preferred embodiment of the invention wherein the catalyst is produced from reactants, including n-butyl chloride, there is also obtained substantially higher yields than have been possible by employing conventional catalyst preparation methods. The above description has also set forth methods for the polymerization of unsaturated organic compounds and particularly conjugated diolefinic and alkenyl aryl monomers utilizing the novel catalysts of this invention.

Obviously, many modifications and variations of the present invention are possible in light of the above teachings. It is therefore to be understood that within the scope of the appended claims, the invention may be practiced otherwise than as specifically described.

What is claimed is:

1. A process for the production of Alfin catalyst comprising
    (a) mixing in an inert solvent methyl-n-alkyl carbinol with excess metallic sodium to form the sodium compound of said carbinol,
    (b) thereafter introducing an alkyl halide into said reaction mixture to react with the remaining metallic sodium and form alkyl sodium and sodium halide, and
    (c) thereafter introducing a vinyl monoolefin into said reaction mixture to react with said alkyl sodium and form the sodium compound of said vinyl monoolefin.

2. A process according to claim 1 wherein said methyl-n-carbinol is isopropanol.

3. A process according to claim 1 wherein said alkyl halide is n-butyl chloride.

4. A process according to claim 1 wherein said vinyl monoolefin is propylene.

5. A process according to claim 1 wherein said inert solvent is selected from the group consisting of hydrocarbons and mixtures thereof.

6. A process according to claim 1 wherein said process is conducted at ambient reaction temperatures.

7. A process for the production of Alfin catalyst comprising
    (a) mixing in an inert solvent isopropanol with excess metallic sodium to form sodium isopropoxide,
    (b) thereafter introducing butyl chloride into said reaction mixture to react with the remaining metallic sodium and form butyl sodium and sodium chloride, and
    (c) thereafter introducing propylene into said reaction mixture to react with the butyl sodium and form allyl sodium.

References Cited by the Examiner

FOREIGN PATENTS 520,873  1/1956  Canada.

OTHER REFERENCES

Morton, Avery A., "The Alfin Reagent," Advances in Catalysis, ed. Adalbert Farkas (1957), Academic Press, LX, pp. 743–753.

JOSEPH L. SCHOFER, Primary Examiner.

H. I. CANTOR, Assistant Examiner.